United States Patent [19]
Uota et al.

[11] Patent Number: 5,610,976
[45] Date of Patent: Mar. 11, 1997

[54] DUAL CHANNEL ISDN TERMINAL CALL IDENTIFICATION AND SWITCHING SYSTEM

[75] Inventors: Toshihiro Uota, Funabashi; Jiro Nakabayashi, Urawa; Tsuneaki Iwano, Tokyo; Hirotaka Nakano, Musashino; Osamu Nakamura, Hanno, all of Japan

[73] Assignees: Sharp Kabushiki Kaisha, Osaka; Nippon Telegraph & Telephone Corp., Tokyo, both of Japan

[21] Appl. No.: 428,891

[22] Filed: Apr. 25, 1995

[30] Foreign Application Priority Data

Apr. 28, 1994 [JP] Japan .................................. 6-091782

[51] Int. Cl.⁶ .................................................. H04M 3/02
[52] U.S. Cl. .......................... 379/127; 379/201; 379/233; 379/265; 370/385
[58] Field of Search ................................. 379/142, 210, 379/211, 212, 233, 201, 127, 265; 370/68.1, 110.1

[56] References Cited

U.S. PATENT DOCUMENTS

| | | | |
|---|---|---|---|
| 4,958,153 | 9/1990 | Murata et al. | 379/142 |
| 5,029,196 | 7/1991 | Morganstein | 379/142 |
| 5,278,972 | 1/1994 | Baker et al. | 370/68.1 |
| 5,291,549 | 3/1994 | Izumi | 379/233 |
| 5,455,855 | 10/1995 | Hokari | 379/211 |

FOREIGN PATENT DOCUMENTS

| | | |
|---|---|---|
| 3-3449 | 1/1991 | Japan . |
| 3-26194 | 2/1991 | Japan . |
| 3-85858 | 4/1991 | Japan . |
| 5-48721 | 2/1993 | Japan . |

*Primary Examiner*—Ahmad F. Matar
*Assistant Examiner*—Scott Wolinsky

[57] ABSTRACT

A connection control equipment can connect a plurality of calls originating from a terminal to a private side terminal by identifying the calling terminal. Each of the user terminals sets a calling number and a calling sub-address or a user-to-user information for identifying the terminal in a call-setting message. A switching system of the connection control equipment receives the call-setting message and stores the calling number and the calling sub-address or the user-to-user information of the message, and connects the call to a private side terminal with which the same user terminal issuing the just received call is communicating. The switching system can connect calls from the same user terminal to the same private terminal, allowing for any user terminal to freely transmit a plurality of calls without considering how to access a host computer.

13 Claims, 6 Drawing Sheets

FIG.5

| PROTOCOL IDENTIFIER | CALLING NUMBER | CLASS OF MESSSAGE: CALL-SETTING MESSAGE | TRANS-MISSION CAPACITY | CALLING NUMBER | CALLING SUB-ADDRESS | CALLED NUMBER |

FIG.6

| PROTOCOL IDENTIFIER | CALLING NUMBER | CLASS OF MESSSAGE: CALL-SETTING MESSAGE | TRANS-MISSION CAPACITY | CALLED NUMBER | USER-TO-USER INFORMATION |

DUAL CHANNEL ISDN TERMINAL CALL IDENTIFICATION AND SWITCHING SYSTEM

BACKGROUND OF THE INVENTION

1. Field of the Invention

The present invention relates to connection control equipment. More particularly, it relates to connection control equipment for use in a communication system for simultaneously providing services for a number of terminals, which is capable of identifying each terminal requesting multi-channel communication services by a calling number and a calling sub-address, or by user-to-user information in a message, and which correlates calls of a calling user terminal.

2. Description of the Prior Art

Japanese Laid-open Patent Publication No. 5-48721 (reference (1)) discloses conventional connection control equipment for switching circuits in an exchange. It receives a telephone call over an integrated service digital network (ISDN); and determines a receiving terminal number by an ISDN user-to-user information, as a retrieval key other than the calling number, and may connect it to a selected receiving terminal number in view of, e.g., sex and (or) department of the calling person, to correctly respond to the requirement of the calling person.

Japanese Laid-open Patent Publication No. 3-3449 (reference (2)) discloses connection control equipment that can select a suitable one of prepared modems by an electronic switch at its receiving side. This means that the need for determining a type of modem is eliminated and time and operation of checking the modem for its adaptability are saved.

Japanese Laid-open Patent Publication No. 3-26194 (reference (3)) discloses connection control equipment which is capable of identifying a group of the automatic call distribution (ACD) by the calling number in an ISDN protocol and distributing incoming calls among receiving terminals within the ACD group depending upon traffic charge to the group. Thereby, distributed connections for each area of the calling parties are realized.

Japanese Laid-open Patent Publication No. 3-85858 (reference (4)) discloses connection control equipment which includes the ability to identify a calling number in a call-setting message of a call transmitted over an ISDN for connecting a private exchange to the ISDN and the ability to determine a kind of service to be provided for the incoming call according to the call-setup message. It can provide different calling subscribers with different services for the calls incoming over an ISDN.

In a communication system that provides services over two B-channels of an ISDN (Integrated Service Digital Network), a calling terminal and an information processing adapter (a called terminal) are connected through respective basic interfaces to the public network of the ISDN. The information processing adapter compresses service data received from the host computer and transmits them to the calling terminal over the ISDN by using two B-channels of the ISDN line. It also receives and expands service data transmitted from the terminal through two B-channels of the ISDN line and transfers them to the host computer.

The following is a connection control procedure for communications by using two B-channels.

In this case, terminal (caller) makes a call request (first call over one of the two B-channel) by dialing a telephone number allocated to a line connected to the information processing adapter (called terminal). After connection of the call to the information processing adapter communication conditions are negotiated between the calling and called terminals. If the negotiation is concluded to provide two B-channel services, the terminal makes a call request (a second call over the other B-channel) by dialing a telephone number allocated to the line connected to the information processing adapter (called terminal). The two B-channels from the calling terminal are thus connected to the called terminal through which the required service can be provided.

Furthermore, in a communication system which is capable of communicating with a plurality of outside terminals at a time by using conventional switching equipment accommodating a plurality information processing adapters (private-side terminals), the information processing adapters are each connected by a bus line to the host computer. The bus topology enables all the information processing adapters to receive and transmit service data to and from the computer at a time.

The following is a connection control procedure for communication by using two B-channels.

The calling terminals make each a first call request (over the first B-channel) by dialing a representative telephone number allocated to a group of lines connected to the switching system and respective private line numbers of the information processing adapters (called terminals). The switching system selects the respective information processing adapters by the private line numbers and connects the calls from the terminals to the corresponding information processing adapters.

After connection of the calls to the information processing adapters both parties negotiate with each other as to communication conditions over the connected lines. If the negotiations are concluded to provide two B-channel services, the terminals make each a second call request (over the second B-channel) by dialing a representative telephone number allocated to a group of lines connected to the exchange unit and respective private line numbers of the information processing adapters (called terminals). The two B-channels from the calling terminals are thus connected to the information processing adapters through which the required services can be provided.

As described above, the communication system using conventional switching equipment requires a user of a calling terminal to specify a private line number of an information processing adapter (called terminal) when requesting connection of two calls to the designated adapter.

However, it is desirable that a calling party makes two calls without dialing a private line number of an information processing adapter. It is further desirable to have a switching system automatically control connection of the two calls to the same adapter if services, to be requested by the caller and to be supplied from the computer through each information processing adapter, are the same.

SUMMARY OF THE INVENTION

It is an object of present invention to provide connection control equipment for use in a communication system, with a switching system for providing services for a plurality of user terminals at a time, which is capable of identifying a calling user terminal sending two calls over a public line of an ISDN and capable of connecting the calls of the calling terminal to one of the private-side terminals.

It is another object of the present invention to provide connection control equipment with a switching system accommodating a plurality of public lines of an Integrated Services Digital Network (ISDN) at its public-line-side and a plurality of terminals of the ISDN at its private-line-side, wherein:

(1) the switching system includes identifying means for identifying a calling terminal making a first channel call and a second channel call over the ISDN public lines and connecting means for connecting two calls from the identified public-network-side calling terminal to a private-side ISDN terminal;

(2) the switching system has identifying means for identifying a calling terminal of an incoming call by a calling number and a sub-address in a call-setting message and connecting means for connecting calls from the same calling terminal to the same private-side ISDN terminal;

(3) the switching system includes comparing means that has a memory area for each public line of the ISDN to store therein a calling number and a sub-address of a calling terminal in a call-setting message of an incoming call and compares the calling number and the sub-address of the calling terminal with a calling number and a sub-address of a calling terminal that is communicating over another public line of the ISDN and connecting means to connect the call from the terminal to a private-side ISDN terminal whereto the communicating calling terminal is connected when both the calling terminals are identified as the same; and (4) the switching system includes identifying means for identifying a calling terminal of an incoming call by a user-to-user information contained in a call-setting message and connecting means for connecting calls originating from an identified calling terminal to a private-side ISDN terminal.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

FIG. 5 is a view showing an example of a call-setting message format.

FIG. 6 is a view showing another example of a call-setting message format.

PREFERRED EMBODIMENT OF THE INVENTION

Figure 1:
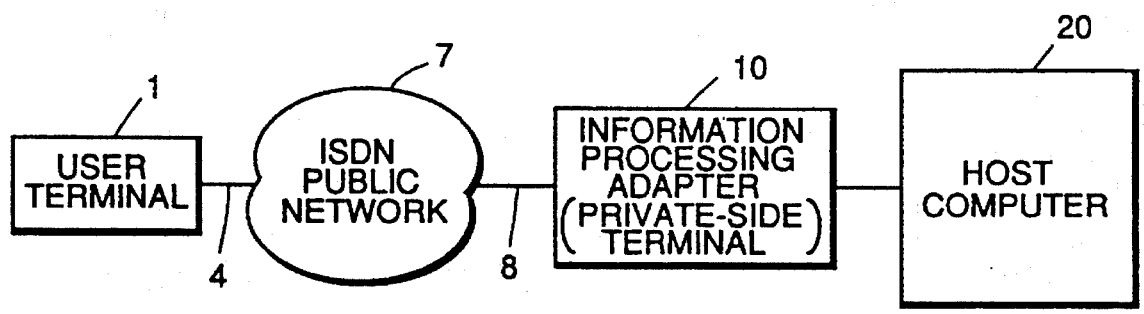
FIG. 1 is a view showing an example of a conventional communication system.

FIG. 1 is a view showing an exemplified configuration of a communication system that provides services over two B-channels of an ISDN (Integrated Service Digital Network). In FIG. 1, there are shown a terminal 1, an ISDN line 4, a public network 7 of the ISDN, an ISDN line 8, an information processing adapter 10 and a host computer 20.

The terminal 1 and the information processing adapter 10 are connected through respective basic interfaces to the public network 7 of the ISDN. The information processing adapter 10 compresses service data received from the host computer 20 and transmits them to the terminal 1 over the ISDN by using two B-channels of the ISDN line 4. It also receives and expands service data transmitted from the terminal 1 through two B-channels of the ISDN line 4 and transfers them to the host computer 20.

The following is a connection control procedure for communications by using two B-channels.

The terminal 1 (caller) makes a call request (first call over one of the two B-channels) by dialing a telephone number allocated to a line connected to the information processing adapter (called terminal) 10. After connection of the call to the information processing adapter 10, communication conditions are negotiated between the calling and called terminals. If the negotiation is concluded to provide two B-channel services, the terminal 1 makes a call request (a second call over the other B-channel) by dialing a telephone number allocated to the line connected to the information processing adapter (called terminal) 10. The two B-channels from the calling terminal 10 are thus connected to the called terminal 10 through which the required service can be provided.

Figure 2:
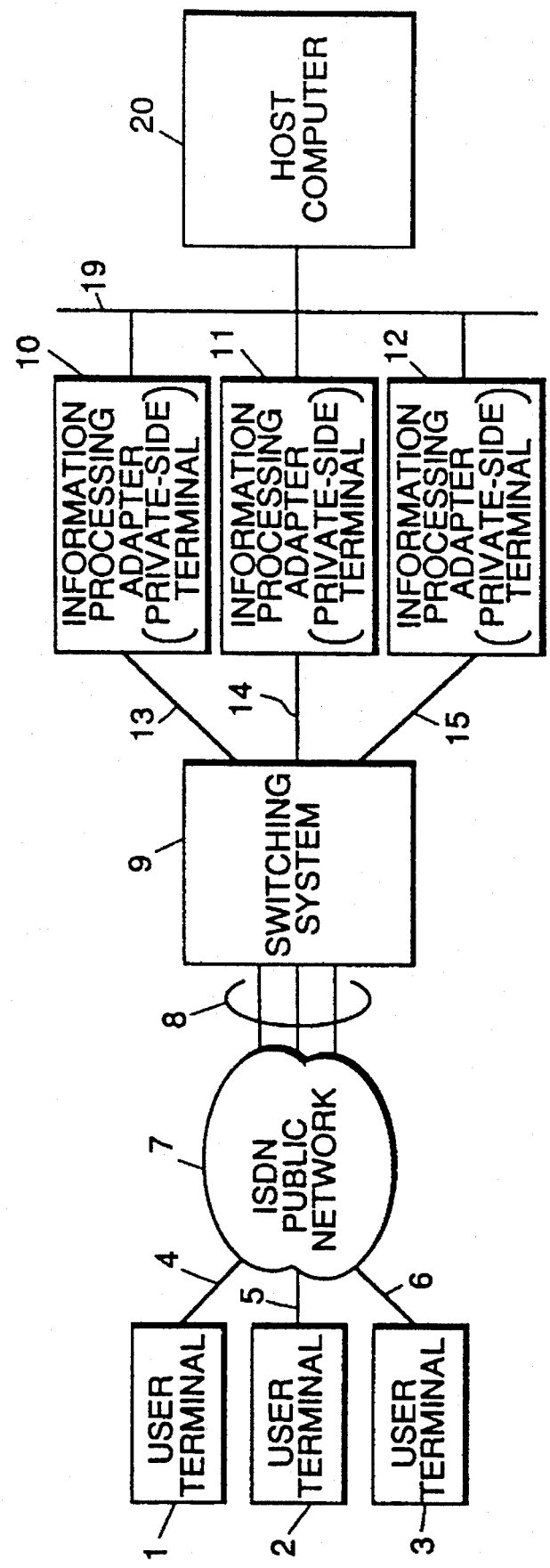
FIG. 2 is a construction view of a conventional connection control device.

FIG. 2 is a view showing an exemplified configuration of a communication system which is capable of communicating with a plurality of outside terminals at a time by using a conventional switching equipment accommodating a plurality of information processing adapters (private-side terminals). In FIG. 2, there are shown terminals 1–3, ISDN lines 4–6, a public network 7 of the ISDN, a group of ISDN lines 8, a switching system 9, information processing adapters (private-side terminals) 10–12, private lines 13–15, a data bus 19 and a host computer 20.

The information processing adapters 10–12 are each connected by a bus line 19 to the host computer 20. The bus line topology enables all the information processing adapters 10–12 to receive and transmit service data to and from the computer 20 at a time.

The following is a connection control procedure for communication by using two B-channels.

The calling terminals 1–3 make each a first call request (over the first B-channel) by dialing a representative telephone number allocated to a group of lines 8 connected to the switching system 9 and respective private line numbers of the information processing adapters (called terminals) 10–12. The switching system 9 selects the respective information processing adapters 10–12 by the private line numbers and connects the calls from the terminals 1–3 to the corresponding information processing adapters 10–12. After connection of the calls to the information processing adapters 10–12 both parties negotiate with each other as to communication conditions over the connected lines. If the negotiations are concluded to provide two B-channel services, the terminals 1–3 make each a second call request (over the second B-channel) by dialing a representative telephone number allocated to a group of lines 8 connected to the exchange unit 9 and respective private line numbers of the information processing adapters (called terminals) 10–12. The two B-channels from the calling terminals 1–3 are thus connected to the information processing adapters 10–12 through which the required services can be provided.

As described above, the communication system using conventional switching equipment requires a user of a calling terminal to specify a private line number of an information processing adapter (called terminal) when requesting connection of two calls to the designated adapter.

However, it is desirable that a calling party makes two calls without dialing a private line number of an information processing adapter and that a switching system automatically control connection of the two calls to the same adapter if services, to be requested by the caller and to be supplied from the computer through each information processing adapter, are the same.

In view of the foregoing, the present invention was made to provide connection control equipment for use in a communication system with a switching system for providing services for a plurality of user terminals at a time, which is capable of identifying a calling user terminal sending two calls over a public line of an ISDN and capable of connecting the calls of the calling terminal to one of the private-side terminals.

To solve the above-mentioned problems, the present invention provides the connection control equipment with a switching system accommodating a plurality of public lines of an Integrated Services Digital Network (ISDN) at its public-line-side and a plurality of terminals of the ISDN at its private-line-side, wherein:

(1) the switching system includes an identifying device for identifying a calling terminal making a first channel call and a second channel call over the ISDN public lines and a connecting device for connecting two calls from the identified public-network-side calling terminal to a private-side ISDN terminal;

(2) the switching system has an identifying device for identifying a calling terminal of an incoming call by a calling number and a sub-address in a call-setting message and a connecting device for connecting calls from the same calling terminal to the same private-side ISDN terminal;

(3) the switching system includes a comparing device that has a memory area for each public line of the ISDN to store therein a calling number and a sub-address of a calling terminal in a call-setting message of an incoming call and compares the calling number and the sub-address of the calling terminal with a calling number and a sub-address of a calling terminal that is communicating over another public line of the ISDN and a connecting device to connect the call from the terminal to a private-side ISDN terminal whereto the communicating calling terminal is connected when both the calling terminals are identified as the same; and (4) the switching system includes an identifying device for identifying a calling terminal of an incoming call by a user-to-user information contained in a call-setting message and a connecting device for connecting calls originating from an identified calling terminal to a private-side ISDN terminal.

In the above-mentioned communication system, the switching system receives a call from a calling terminal over an ISDN, memorizes a calling number and a sub-address or a user-to-user information, and then checks whether another call from the same calling terminal arrives or is communicating. If the another call from the same calling terminal exists, the switching system connects the current call to a private-side terminal whereto the first channel call has been connected. Namely, the switching system can automatically identify a calling terminal from call-setting message of each incoming call and can automatically connect two calls from a calling terminal to a private-side terminal when the calling terminal made the two calls without dialing an extension number of the private-side terminal.

The automatic identifying device identifies a calling terminal, preferably, by its call number and sub-address or user-to-user information, which can be preset for each calling terminal.

Figure 3:
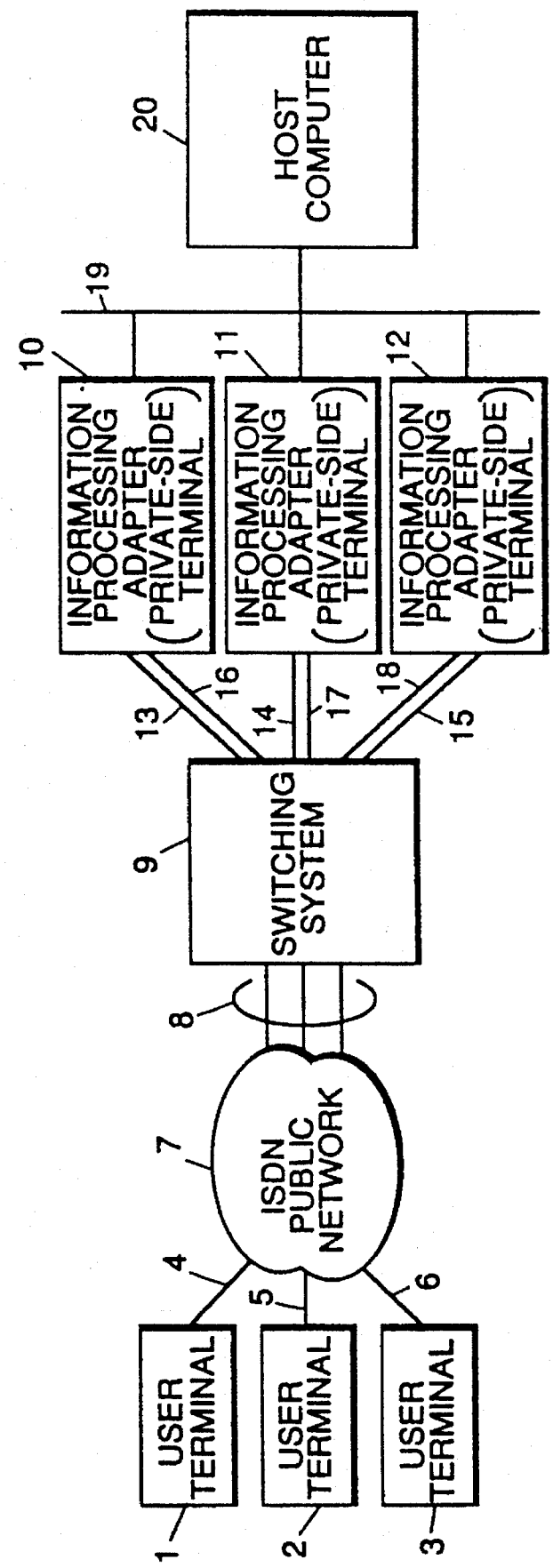
FIG. 3 is a construction view for explaining a connection control device embodying the present invention.

FIG. 3 is a construction view for explaining an embodiment of a connection control equipment according to the present invention. In FIG. 3, there are shown terminals 1–3, ISDN lines 4–6, a public network 7 of the ISDN, a group of ISDN lines 8, a switching system 9, information processing adapters (private-side terminals) 10–12, private lines 13–18, a data bus line 19 and a host computer 20.

In FIG. 3, the terminals 1–3 can use services by using two B-channels and are connected through the basic interface lines 4–6 respectively to the public network 7 of the ISDN. Each of the basic interface lines 4–6 can connect calls of two B-channels. The switching system 9 is connected by the grouped lines 8 of the basic interface to the public network of the ISDN and carries out necessary switching to route a call to or from each private line terminal. Each of the basic interface lines 8 can connect calls of two B-channels. Each private line can connect one B-channel call.

The switching system 9 accommodating a plurality of public lines 8 of the ISDN and a plurality of private-lines 13–18 for the ISDN terminals 10–12 receives calls incoming over the ISDN public lines, identifies calling terminals of the received calls and connects the calls received from a terminal to a private-side ISDN terminal. The switching system may use either of two types of identifying devices: one of which is to identify a calling terminal by a calling number and a sub-address specified in its call-setting message and the other of which is to identify a calling terminal by a user-to-user information in its call-setting message.

Figure 4:
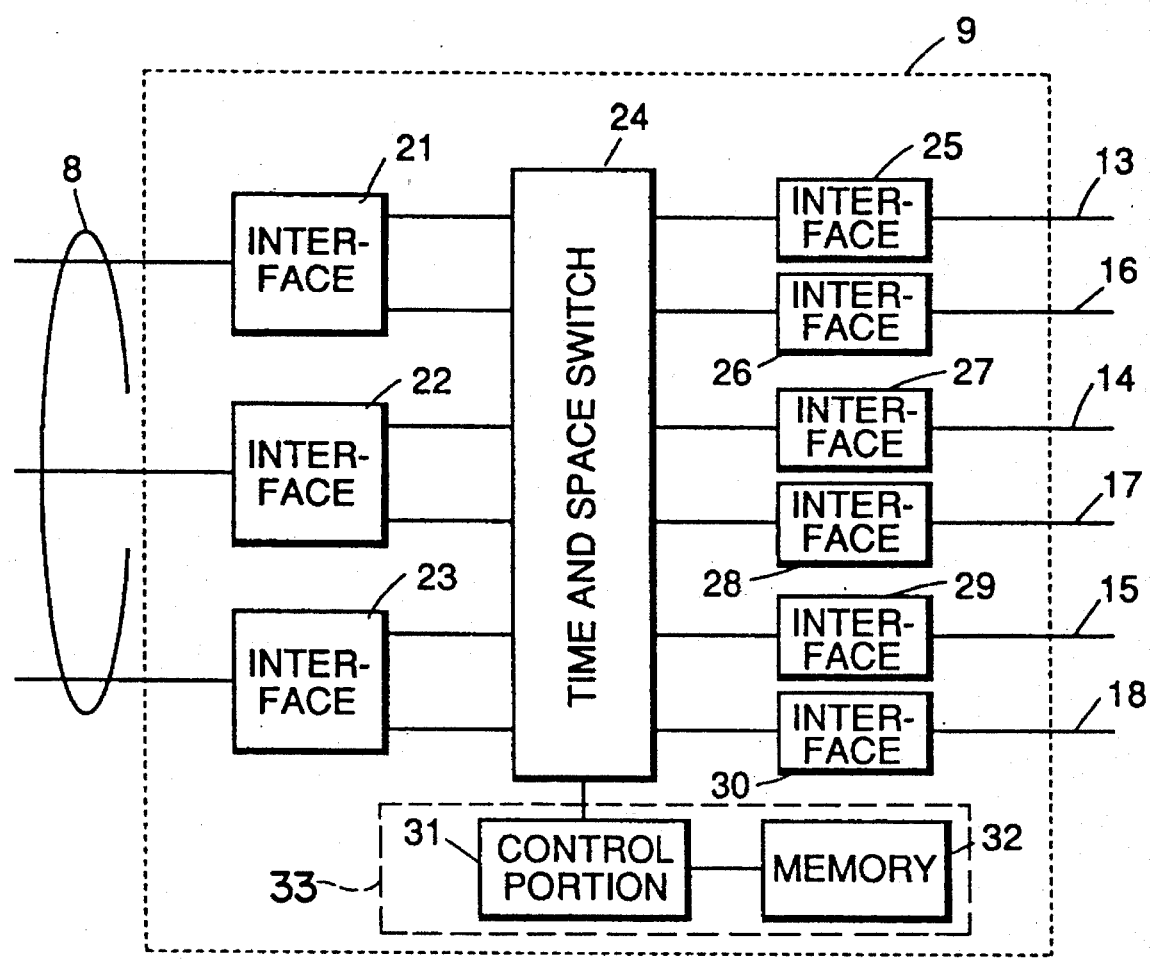
FIG. 4 is a construction of a switching system shown in FIG. 3.

FIG. 4 is an inside construction view of the switching system shown in FIG. 3. In FIG. 4, there are shown line interfaces 21–23, a time and space switch 24, private line interfaces 25–30, a control portion 31, a terminal information memory 32. Other parts similar in function to those shown in FIG. 3 are designated by the same reference numerals.

A group of basic interface lines 8 terminates at the line interfaces 21–23 respectively, which splits the corresponding lines 8 each into two B-channels. The time and space switch 24 can carry out switching operations to route data from the network user terminals to the private-line terminals and vice versa. The private line terminals 13–18 are connected through the private line interfaces 25–30 respectively to the time and space switch 24. The switch control portion 31 handles with call control (call setting) messages from the basic interface lines 8 and call control messages from the private line terminals and it drives the time and space switch 24 to connect calls from the terminals to the host computer. The terminal information memory 32 stores therein information extracted from the call control messages for identifying the private-line terminals. The switch control portion 31 and the terminal information memory 32 are part of the identifying device 33.

The information processing adapters (private-line terminals) 10–12 are intended to process service data, i.e., each adapter carries out compression and expansion of video and audio data and multiplexing and separating of the compressed video and audio data to provide services through two B-channels. The information processing adapters 10–12 are all wired into the switching system 9, each by two of the private lines 10–12, and are connected to the host computer 20 by using bus lines. Video and audio data processed in each information processing adapter are transferred to the computer 20 or the calling user terminal.

The line connection procedure of the above-mentioned communication system embodying the present invention is as follows:

The user terminal 1 requiring to be connected to the host computer 20 transmits a call-setting message containing a representative number of grouped lines 8 connected to the switching system 9 as a called number information element, a subscriber number of the line 4 as a calling number information element and an identifier of the terminal 1 as a sub-address information element. When an indicating identifier of the calling number information element is set to be indicated, the subscriber number can be omitted because it is set on the ISDN public line and transferred to the switching system 9. By doing so, the subscriber number can be always transferred with no change in the terminal settings, even in case of connecting the terminal 1 to another called line.

Serial numbers allocated to the terminals included in the entire communication system may be used as calling sub-addresses of the calling terminals. In this case, calling sub-addresses may be used without any change even if the configuration of terminals in the communication system is changed, e.g., by connecting a plurality of user terminals to one basic interface line by bus line or to private lines of a private branch exchange. When terminals within the basic interface lines 4–6 are serially numbered and these numbers are used as their sub-addresses, it is possible to increase or decrease a quantity of terminals within the interface independent of the whole communication system.

When the user interface lines are serially numbered and allocated each to one user terminal, each user terminal of the line may be identified only by its subscriber number and, therefore, the calling sub-address may be omitted. This enables the communication system to accommodate terminals that cannot transmit their sub-addresses.

FIG. 5 shows an example of a format of a call setting message used in a connection control equipment according to the present invention. A calling number information element is specified by a subscriber line number and a calling sub-address information element is specified by data for identifying a calling terminal. The ISDN public network 7 establishes B-channels on the line 4 for communication with a terminal 1 and transmits a call-setting message designating any one of B-channels on grouped lines 8 to a switching system 9. This message contains a calling number and a calling sub-address set by the terminal 1. The switching system 9 has an area in a terminal information memory 32 and stores therein the calling number and the sub-address in the call setting message received.

The switching system 9 checks whether another call from the same terminal is connected or not by comparing a calling number and a sub-address of a calling terminal being communicated over another B-channel within the grouped lines 8 with the just stored information. If another call from the same terminal was not found, the switching system selects any one of the information processing adapters (e.g., an adapter 10) and connects the terminal 1 through a first B-channel in one of the grouped lines 8 to the selected adapter 10 through a private line 13. One-channel communication can now be conducted.

The conventional methods for identifying a calling number and a calling sub-address that is disclosed in the known references (2)–(4) are all such that a group of called terminals, class of a modem and a kind of service, which are required by a calling terminal, are identified and a calling number and a sub-address of the calling terminal is used for selecting the called terminal. On the other hand, the connection control equipment according to the present invention is featured in that its switching system 9 houses one group of called terminals (information processing adapters), one type of modem and one kind of service to be provided, and uses a calling number and a sub-address for identifying a second call of the same calling terminal as described later.

When negotiation by communication over a first B-channel is concluded to carry out two-channel communication between the terminal 1 and the information processing adapter 10, the terminal 1 transmits again a call-setting message containing a representative number of a group of lines 8 connected to the switching system 9 as a called number information element, a subscriber number of the line 4 as a calling number information element, and an identifier for identifying the terminal 1 as a calling sub-address information element. The calling number and the sub-address in this message are the same as those of the first call setting message.

The ISDN public network 7 establishes a B-channel on the line 4 for communication with the user terminal 1 and transmits the call-setting message specifying any one of B-channels in grouped lines 8 to the switching system 9 which in turn stores the calling number and the calling sub-address in the received call-setting message in the memory 32 and compares the stored information with those of the user terminal being communicated over another public line of the ISDN. The switching system 9 recognizes that the received call is a new call originating from the same terminal that has been connected to the information processing adapter 10, and then connects the terminal 1 to the information processing adapter 10 through a private line 16.

Two calls (two B-channels) are thus established between the terminal 1 and the information processing adapter 10 by routing through the line 4, the ISDN public line 7, the grouped lines 8, the switching system 9, private lines 13 and 16. Compressed video and audio data are transferred from the information processing adapter 10 to the user terminal 1 and vice versa.

FIG. 6 shows a format of a call-setting message used for another embodiment of a connection control equipment according to the present invention. A user-to-user information element in the message is specified by data enough to identify a calling terminal.

The terminal 1 requesting to be connected to the host computer 20 transmits a call-setting message containing a representative number of a group of lines 8 connected to the switching system 9 as a called number information element and a user-to-user information for identifying the terminal 1 as a user-to-user information element. The user-to-user information may be an ID number for identifying a terminal or a pass-word for recognizing the right of accessing the computer 20, which can be used for maintenance of the communication system.

The ISDN public network 7 establishes a B-channel on the line 4 for communication with the user terminal 1 and transmits the call-setting message specifying any one of B-channels in grouped lines 8 to the switching system 9. The call-setting message contains the user-to-user information set by the terminal 1. The switching system 9 has an area in the terminal information memory 32 and stores therein the user-to-user information contained in the received call-setting message.

The switching system 9 compares the stored user-to-user information with that of the user terminals being communicating over another public line of the ISDN. When another call from the same terminal is not found, the switching system selects an information processing adapter 10 whereto no user terminal is connected, and connects the terminal 1 through a B-channel in one of the grouped lines 8 to the selected adapter 10 through a private line 13. One-channel communication can be now conducted between the terminal 1 and the information processing adapter 10.

When the communication over a first B-channel comes to a conclusion to make two-channel communication between the terminal 1 and the information processing adapter 10, the terminal 1 transmits again a call-setting message containing a representative number of a group of lines 8 connected to the switching system 9 as a called number information element and a user-to-user information for identifying the terminal 1 as a user-to-user information element. The user-to-user information in this message is the same as that shown in the first call setting message.

The ISDN public network 7 establishes a B-channel on the line 4 for communication with the user terminal 1 and transmits the call-setting message specifying any one of B-channels in grouped lines 8 to the switching system 9 which in turn stores the user-to-user information shown in the received call-setting message in the memory 32 and compares the stored information with those of the user terminal being communicating over another public line of the ISDN. In this case, the switching system 9 recognizes that the received call is a new call originating from the same terminal that has been connected to the information processing adapter 10, and then connects the terminal 1 to the information processing adapter 10 through a private line 16.

Two calls (two B-channels) are thus established between the terminal 1 and the information processing adapter 10 by routing through the line 4, the ISDN public line 7, the grouped lines 8, the switching system 9, private lines 13 and 16. Compressed video and audio data are transmitted from the information processing adapter 10 to the user terminal 1 and vice versa.

The following is a practical procedure for making a call by a user terminal.

A user who wishes to communicate with a host computer 20 presets his terminal 1 to be for two-channel communication and dials a representative number (subscriber number) of a group of lines 8 connected to a switching system 9. The calling terminal 1 sets the representative number inputted by the user as a called number information element, a subscriber terminal line 4 previously registered on the calling terminal 1 as a calling number information element and a sub-address for identifying the calling terminal 1 previously registered on the calling terminal 1 as a calling sub-address information element in a call-setting message.

When an indicating identifier of the calling number information element is set to be indicated, the ISDN public network automatically sets the subscriber number of the calling terminal 1 and does not require the user to enter the subscriber number as the calling number information element. When only one terminal is connected with one line 4, the terminal can be identified by its subscriber number set as the calling number information element. Therefore, the sub-address is not needed to be set as the calling sub-address information element in the call setting message.

Indispensable information elements such as a protocol identifier, calling number and kind of message are set in the call setting message. An identifier indicating a standard protocol is set as the protocol identifier, a value specifying a call-setting message is set as the class of message and a value selected by the calling terminal in a range of values defined by the standard is set as the calling number. The transmission capacity is specified by an identifier indicating a non-restricted digital information, a switched exchange and a data transmission speed of 64 kbs.

However, in claim 4, an information for identifying the calling terminal 1, which has been previously registered on the terminal 1, is used as a user-to-user information element instead of the calling number information element and the calling sub-address information element.

The thus prepared call setting message is transmitted to the ISDN public network 7. The above mentioned call setting message does not contain an information requiring two-channel communication.

The switching system 9 receives the call setting message transmitted from the terminal 1 over the ISDN public network 7, selects any one of unoccupied information processing adapters (e.g., an adapter 10) and sends a responding message to the calling terminal 1. One-channel communication is now possible between the calling terminal 1 and the information processing adapter 10.

The calling terminal 1 and the information processing adapter 10 exchange with each other their communication capacity messages over the connected one-channel communication path. In this case, the calling terminal 1 sets transmission rate at 128 kbps for two-channel communication in the communication capacity message and transmits the message to the information processing adapter 10. The information processing adapter 10 also informs the calling terminal of its possible transmission rate of 128 kbps for two-channel communication.

The calling terminal 1 recognizes the possibility of two-channel communication with the information processing adapter 10 and automatically makes a second channel call. The call-setting message of the second channel call is the same that of the first channel call.

The switching system 9 receives the second call-setting message from the calling terminal 1 over the ISDN public network 7, selects the information processing adapter 10 according to the procedure described in the specification of the present application and sends a responding message to the calling terminal 1, informing of the possibility of conducting two-channel communication between the calling terminal 1 and the information processing adapter 10.

Figure 7:
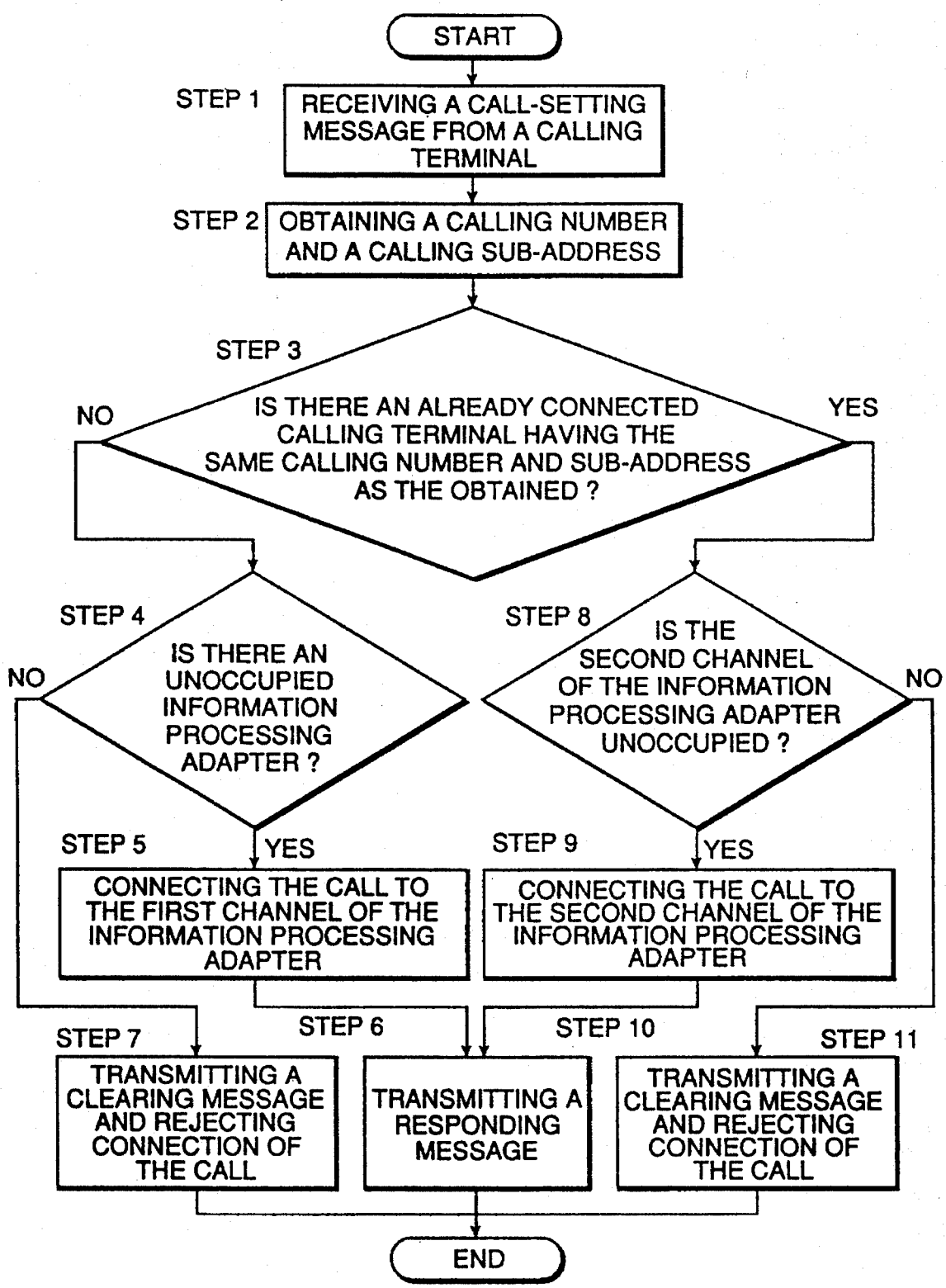
FIG. 7 shows an example of procedure for connecting lines in a switching system.

FIG. 7 shows a procedure for connecting the lines in a swiching system. In a switching system 9, line connections are conducted according to the following procedure.

Upon receipt of a call-setting message from a calling terminal over the ISDN public network (step 1), the switching system obtains a subscriber number and a sub-address of the calling terminal from the call-setting massage and stores them in a table for call management (step 2). At the same time, the switching system checks whether another call of a calling terminal is present, having the same subscriber number and sub-address as those of the current call, by retrieving in the call management table (step 3).

When no terminal having the same subscriber number and sub-address is found, the switching system judges the current call to be a first channel call, searches an unoccupied information processing adapter (step 4) and connects the current call to a first channel of the unoccupied information processing adapter (step 5), sending a responding message to the calling terminal (step 6). If there is no unoccupied information processing adapter, the switching system transmits a clear message to the calling terminal and rejects connection of the call (step 7).

When there is a call from a calling terminal having the same subscriber number and sub-address as those of the current call, the switching system checks whether the second channel of an information processing adapter, to which the calling terminal is connected, is unoccupied or not (step 8).

When the second channel of the information processing adapter is unoccupied, the switching system connects the current call to the second channel of the information processing adapter (step 9) and transmits a responding message to the calling terminal (step 10).

When the second channel of the information processing adapter is occupied (i.e., two calls from the same calling terminal are connected to the information processing adapter), the switching system judges this as an error call-setting and transmits a clear message to reject connection of the call (step 11).

As is apparent from the foregoing, the connection control equipment according to the present invention has a switching system that accommodates a plurality of the ISDN public lines in its network side and a plurality of private lines in its private side and has a device for identifying a calling terminal transmitting a call over any one of the ISDN lines and a device for connecting two calls from a user terminal to a private side ISDN terminal. Accordingly, this equipment allows every user terminal to require communication over a plurality of channels by freely making a call without regard to configuration of the host computer and, particularly, to private circuits of the switching system. When a plurality of user terminals requires multi-channel communications at a time, this connection control equipment can correctly correlate user terminals with corresponding information processing adapters, assuring correct terminal-to-terminal connections.

We claim:

1. A switching system accommodating a plurality of public lines of an Integrated Services Digital Network (ISDN) at a public line side and a plurality of terminals of the ISDN at a private line side, comprising:

identifying means for identifying a calling terminal issuing a first channel call and issuing a second channel call, both issued at the public line side of the ISDN; and connecting means for automatically connecting the identified calling terminal at the public line side of the ISDN to a private-side ISDN terminal without the calling terminal calling a private line number of a private ISDN terminal and upon, after issuance of the second channel call, the identifying means identifying the calling terminal as being the same calling terminal from which the first channel call was made, based upon common information obtained at the issuance of each of the first channel call and the second channel call.

2. The switching system of claim 1, wherein the identifying means identifies the calling terminal of an incoming call based upon a calling number and a sub-address received in a call-setting message and the connecting means connects first channel and second channel calls from the same calling terminal to the same private-side ISDN terminal.

3. The switching system of claim 2, wherein the identifying means includes:

a memory for storing a calling number and a sub-address of a calling terminal in a call setting message upon arrival of a first channel call over a first public line; and comparing means for comparing the stored calling number and the sub-address of the calling terminal issuing the first channel call with a calling number and a sub-address of a calling terminal issuing the second channel call over another public line of the ISDN, wherein the connecting means connects the second channel call to a private-side ISDN terminal upon the comparing means determining a calling number and a sub-address match between the calling terminal issuing the first channel call and the calling terminal issuing the second channel call.

4. The switching system of claim 1, wherein the identifying means identifies the calling terminal of an incoming call based upon user-to-user information received in a call-setting message and the connecting means connects first channel and second channel calls originating from a same identified calling terminal to a same private-side ISDN terminal.

5. The switching system of claim 1, wherein the identifying means, upon receiving an issued first channel call, first determines availability of a private-side ISDN terminal and then transmits a message to the calling terminal, rejecting the issued first channel call, upon determining that no private-side ISDN terminal is available.

6. The switching system of claim 5, wherein, upon the identifying means determining availability of a private-side ISDN terminal, the connecting means temporarily connects the calling terminal issuing the first channel call to the available private-side ISDN terminal.

7. The switching system of claim 6, wherein selection of an available private-side ISDN terminal for connection to the calling terminal issuing the first channel call is random.

8. The switching system of claim 6, wherein, subsequent to the temporary connection, the calling terminal that issued the first channel call is requested to issue a second channel call on another of the plurality of public lines.

9. The switching system of claim 8, wherein the identifying means includes a memory for storing information identifying the calling terminal issuing the first channel call.

10. The switching system of claim 9, wherein the identifying means further includes comparing means for receiving information identifying a calling terminal issuing a second channel call, upon issuance of the second channel call, and for comparing the information identifying the calling terminal issuing the second channel call to the information stored in the memory identifying the first channel call, and upon determining a comparison match, the connecting means automatically connects the identified calling terminal to a private-side ISDN terminal.

11. A switching system, comprising:

a memory for storing information identifying a calling terminal issuing a first channel call at a public line side of an Integrated Services Digital Network (ISDN), the ISDN including a plurality of public lines at a public line side and a plurality of private-side terminals at a private line side, to a private-side ISDN terminal;

comparing means for comparing, upon receipt of information identifying a calling terminal issuing a second channel call, the stored information from the memory to the received information identifying the calling terminal issuing the second channel call; and connecting means for, in response to the comparing means determining a match between the stored and received information, connecting the second channel call of the calling terminal to a private-side ISDN terminal, without the calling terminal calling a private line number of the private-side ISDN terminal.

12. The switching system of claim 11, wherein the information, identifying a calling terminal issuing a first and second channel call, includes a calling number and a subaddress.

13. The switching system of claim 11, wherein the connecting means, upon the comparing means determining a match between the stored and received information, connects the second channel call of the calling terminal to the same private-side ISDN terminal that the calling terminal issued a first channel call to.

* * * * *